UNITED STATES PATENT OFFICE.

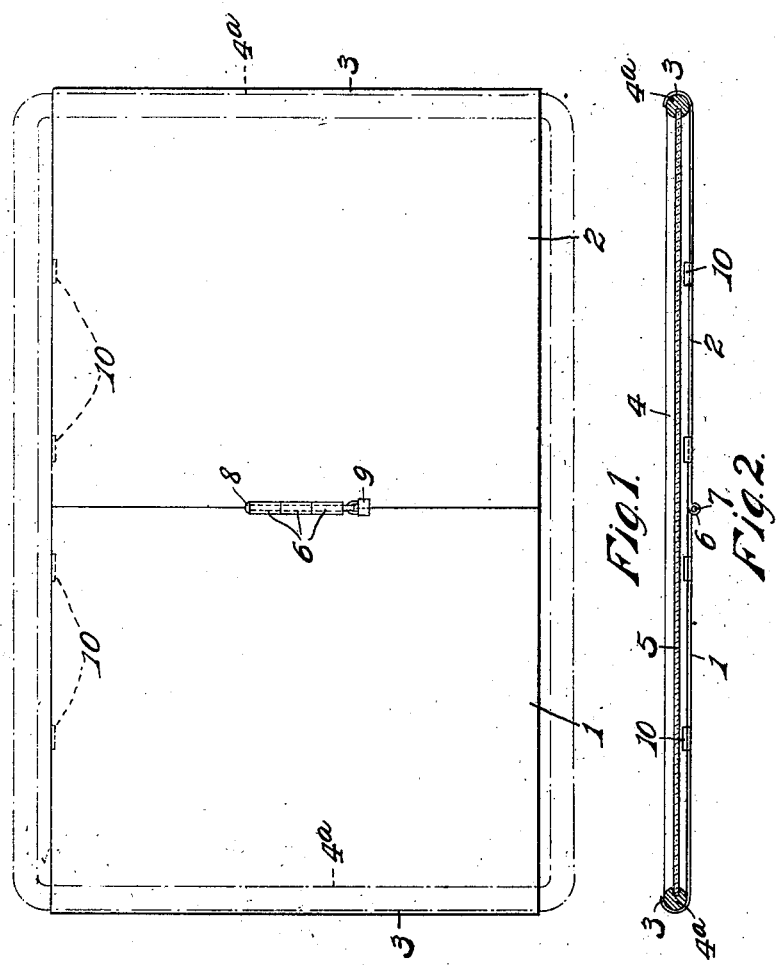

ALBERT E. CANBY, OF HUBBARD, OHIO.

WINDSHIELD-COVER.

1,398,714.  Specification of Letters Patent.  Patented Nov. 29, 1921.

Application filed October 30, 1920. Serial No. 420,677.

*To all whom it may concern:*

Be it known that I, ALBERT E. CANBY, a citizen of the United States of America, and resident of Hubbard, county of Trumbull, and State of Ohio, have invented certain new and useful Improvements in Windshield-Covers, of which the following is a specification.

This invention relates to attachments for the windshields of motor vehicles, and it has for its primary object to provide a blind or cover which is readily attachable to a windshield for preventing or obstructing vision through the latter and which is adapted to be locked against unauthorized removal, with the end in view to guard against theft of the vehicle.

A further object is to provide a device of the character mentioned which is readily applicable to commercial forms of automobile windshields now in use and which requires no change in or alteration of the windshield structure.

In describing the invention in detail, reference is herein had to the accompanying drawings, in which—

Figure 1 is a front elevation of the invention as it appears when applied to a windshield, such windshield being indicated in broken lines, and—

Fig. 2 is an upper edge view of the invention applied to a windshield, the latter being shown in horizontal transverse section.

In said drawings, 1 and 2 indicate two complemental plates of sheet metal, of which each has its outer lateral edge carrying a hook or hooks adapted to partially embrace one of the upright end members 4ª of the frame 4 of an automobile windshield 5. As herein shown, a hook 3 is formed by turning the outer lateral edge of the plate to conformably fit said upright member of the windshield. Said plates are of such length that, when the hooks 3 thereof occupy seated embracing relation to the opposite end members 4ª of the windshield, their opposite, or inner, edges are disposed in meeting relation. Said meeting edges are designed to interlock, there being preferably formed thereon knuckle members or lugs 6 having eyes 7 adapted, in the said position of said plates, to occupy vertically alined relation and to receive therein a headed pin 8 whereby they are attached; said plates being thus attached much in the same manner as the straps of ordinary types of door hinges. The pin 8 has an eye in its projected pointed end adapted for the reception of the shackle of a padlock 9 whereby its unauthorized withdrawal is prevented.

To guard against unauthorized removal of the cover or blind constituted by the plates 1 and 2 when the latter are attached to a windshield in the manner described, each of said plates carries one or more lugs 10 which project inward adjacent to the windshield glass 5. Said lugs, as herein shown, are formed integral with the upper edges of said plates and are designed to engage with the under side of and interlock with the horizontal top member of the windshield frame 4 when it is attempted to elevate the cover from the windshield to effect detachment thereof.

The cover described is designed for application to the windshield of a car when the latter is not in use, as when standing in a garage or when parked in a street. So applied, said cover forms a barrier to vision through the windshield and, therefore, renders driving of the automobile very difficult, if not impossible. Further, said cover serves to indicate to observers of a driven car to which it is applied that the use being made of such car is unauthorized.

As is manifest, the attaching and locking means provided at the meeting edges of the plates 1 and 2, as herein shown and described, exemplify but one of various means which might be employed. I would therefore have it understood that I do not desire to limit myself to the precise structural details herein shown and described, but rather to include all such changes as reasonably fall within the scope of the appended claims.

What is claimed is—

1. A cover for automobile windshields, comprising a pair of complemental plates adapted to be mounted in horizontally-alined vision-obstructing relation to a windshield, each plate having a hook formed at its outer lateral edge for partially embracing the end portion of the frame of the windshield when the opposite edges of said plates occupy meeting relation, and means for interlocking said meeting edges.

2. A cover for automobile windshields, comprising a pair of complemental plates adapted to be mounted in horizontally-alined vision-obstructing relation to a windshield, each plate having means engageable with the end portion of the frame of a windshield when the opposite edges of said plates occupy meeting relation, means for interlocking said meeting edges, and means for preventing elevation of said plates past the top portion of the windshield.

3. A cover for automobile windshields, comprising a pair of complemental plates adapted to be mounted in horizontally-alined vision-obstructing relation to a windshield, each plate having means engageable with the end portion of the frame of a windshield when the opposite edges of said plates occupy meeting relation, means for interlocking said meeting edges, and means for preventing disengagement of said plates from the windshield through vertical elevation of the former, said preventing means including lugs carried by one of said elements and engageable with the other when said plates are elevated.

In testimony whereof, I affix my signature in presence of two subscribing witnesses.

ALBERT E. CANBY.

Witnesses:
P. S. MASON,
E. A. W⸺